United States Patent Office 3,835,106
Patented Sept. 10, 1974

3,835,106
METHOD OF CONTROLLING A POLYMER PREPARATION PROCESS
Dirk Klaassen and Luciano J. Spadon, Geleen, and Meindert Tiessens, Beek, Netherlands, assignors to Stamicarbon N.V., Geleen, Netherlands
Continuation of abandoned application Ser. No. 21,457, Mar. 20, 1970. This application Apr. 19, 1972, Ser. No. 245,584
Claims priority, application Netherlands, Mar. 20, 1969, 6904266
Int. Cl. C08f 3/02, 3/06, 1/80
U.S. Cl. 260—94.9 P                    7 Claims

ABSTRACT OF THE DISCLOSURE

A method of process control for the continuous preparation of a polymer is described in which one or more monomers, hydrogen, and one or more catalysts are brought together in a reactor wherein a polymer of uniform properties is achieved by controlling the hydrogen feed in relation to the monomer to hydrogen ratio in the reactor effluent stream.

---

Figure 1:
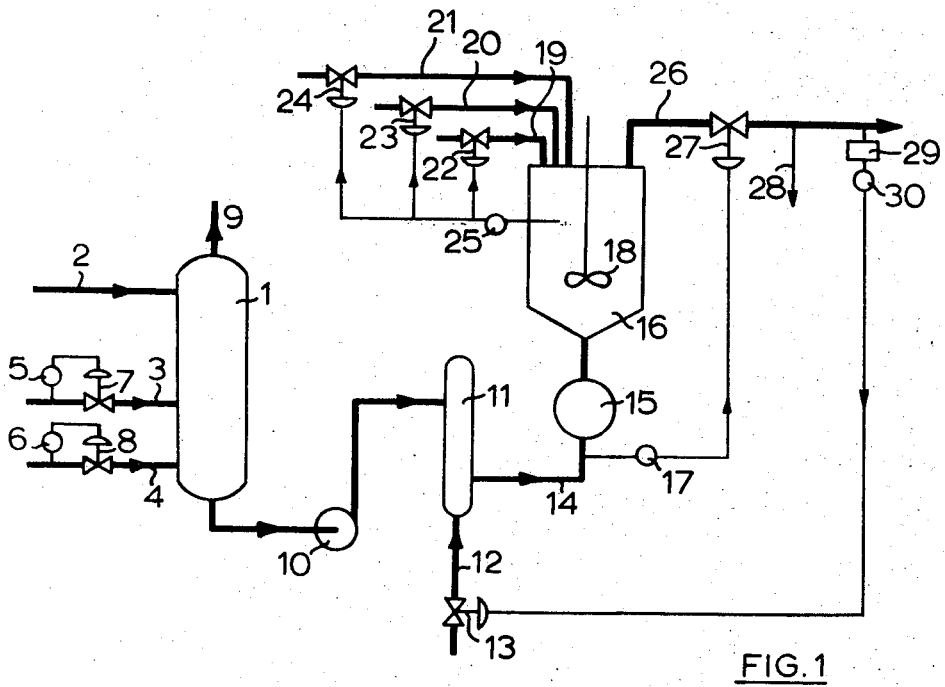

This is a continuation of application Ser. No. 21,457, filed Mar. 20, 1970, now abandoned. The present invention relates to a method for maintaining uniform polymer properties in a continuous process for the polymerization of monomers in which one or more monomers and hydrogen are brought together with one or more catalysts in a reactor wherein the hydrogen feed is controlled in response to measurement data. This present method is particularly suitable for the control of the melt index of polyolefins produced by solution polymerization.

The melt index of a polyefin is in part a function of the average polymer molecular weight and distribution which in turn is dependent upon the relative concentration of terminating radicals such as hydrogen in the reaction zone. Thus, a change in the polymer melt index may be effected or compensated for by an inversely proportional change in the hydrogen feed to the reactor.

In a continuous polymerization process it is desirable to produce and maintain a product having uniform properties through the employment of automatic control devices responsive to the property to be controlled. But difficulty is encountered with regard to the responsive control of polymer melt index in that known techniques for determining the melt index of a sample involve lengthy procedures, far too slow to serve as a practicable basis for process control.

A partial solution to this problem is known from U.S. Pat. 3,356,667 wherein the hydrogen feed volume, the polymer concentration in the reactor, the temperature in the reactor, and the monomer feed volume are used as indicia of the melt index of the resulting polymer. This melt index is calculated and compared with the desired value, and the hydrogen feed is controlled in response to the difference between said values.

Although prompt response is insured by using the factors influencing the melt index rather than the melt index itself, this known control procedure has the disadvantage that its inaccuracy becomes greater as the percentage of monomer or monomers converted into polymer, or degree of conversion, is raised. At a higher degree of conversion, the known procedure will therefore not yield a product of the desired and constant quality, and the equipment needed is complicated and expensive.

An object of the present invention is to provide a more accurate method of controlling and maintaining uniform polymer properties. Another object is to provide a method of controlling the polymer melt index in a process of solution polymerization of olefin monomers. A further object is to provide a method of melt index control which is less complex and less expensive than the methods presently known.

Under the method of the present invention, the monomer feed to the reactor, the reactor temperature and degree of conversion are kept substantially constant, and the monomer to hydrogen ratio in the reactor effluent stream serves as a reference for controlling the quantity of hydrogen to be supplied to the reactor. It has surprisingly been found that a polymer of very constant properties can thus be obtained even at optimally high degrees of conversion. A slight change in the degree of conversion results in a considerable change in the monomer to hydrogen ratio in the reactor effluent, whereas the temperature remains virtually constant. It is this characteristic which permits the present control procedure to have a high sensitivity to small changes in the degree of conversion. Thus an increase in the degree of conversion will result in a decrease in the monomer concentration and thus a decrease in the monomer to hydrogen ratio in the reactor effluent stream. This decrease in the monomer to hydrogen ratio is sensed by, for example, a chromatograph which responds through an appropriate controller by decreasing the hydrogen feed to the reactor to re-establish the original monomer to hydrogen ratio.

A high degree of conversion generally means here a conversion of over 90%, e.g., 96–97%. Working at a high degree of conversion has certain advantages such as lowering the cost for the recirculation of the monomers. A further advantage is that fluctuations in catalyst activity have a relatively slight effect on the conduct of the process at higher degrees of conversion.

It is of very great importance, particularly in the operation of autothermic reactors, that the reactor temperature remain virtually constant. The reactor temperature is preferably kept constant by controlling the amount of catalyst or catalyst components fed into the reactor. Usually these components are supplied separately and in a constant volume ratio.

For the purpose of checking the operation of the process, the melt index may be periodically determined on a sample. As noted above, this is too lengthy a process, taking approximately half an hour, to itself serve as the basis for the process control.

Figure 2:
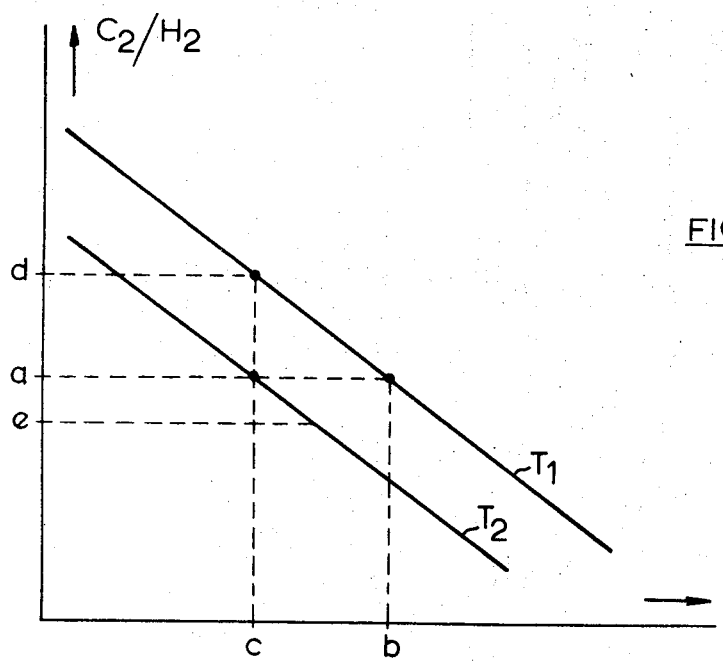

A suitable arrangement for effecting the process control of the invention is shown in FIG. 1, and FIG. 2 is a graph, with specific reference to the preparation of polyethylene, showing the relation between the product melt index and the ethylene to hydrogen ratio after the reactor.

With reference to FIG. 1, in dissolving tank 1 an incoming stream 2, consisting of solvent, is mixed with monomers from monomer feed lines 3 and 4. The quantity per unit time of monomers fed into dissolving tank 1 are kept constant by means of flow controllers 5 and 6 and control valves 7 and 8 operated by said controllers. Vent line 9 is provided to prevent too high a pressure build up in dissolving tank 1.

The monomer solution from dissolving tank 1 is fed by pump 10 to absorber 11 wherein hydrogen is absorbed by the monomer solution. Hydrogen is supplied to absorber 11 in a controlled quantity through line 12 by means of control valve 13. The monomer-hydrogen solution from absorber 11 is continuously fed by line 14 through cooler 15 and into reactor 16. Flow controller 17 is connected to line 14 to operate control valve 27 in the reactor effluent line 26. This control is activated when desired during adiabatic execution of the reaction in order to acheve an extra high output at a given maximum temperature and a given minimum residence time. Reactor 16 is further provided with stirrer 18. The one or more catalyst components are supplied to reactor 16 through lines 19, 20 and 21 with corresponding control valves, 22, 23 and 24. Said control valves are operated by temperature controller 25 which is connected with reactor 16.

The reactor effluent is continuously discharged through line 26 and control valve 27, which is operated by flow controller 17 in reactor feed line 14. The reactor effluent line 26 is provided with sample line 28 to permit a periodic determination of the melt index. The monomer to hydrogen ratio in the reactor effluent stream 26 is continuously determined, for example by means of a chromatograph 29, and the result so obtained is supplied to controller 30 for operating control valve 13 in hydrogen feed line 12.

Employment of the equipment arrangement as described above makes it possible (1) to keep the infeed quantities of monomer constant, (2) to keep the flow rate through the reactor constant, (3) to control the catalyst quantities in such a way as to maintain a constant reactor temperature and (4) to control the quantity of hydrogen present in the reactor in dependent relation to the monomer-hydrogen ratio in the reactor effluent stream.

FIG. 2, having specific relation by way of example to the preparation of polyethylene by the method of this invention, shows the relation between the polyethylene melt index denoted by SI, the ethylene to hydrogen ratio in the reactor effluent, denoted by $C_2/H_2$, and the reactor effluent temperature denoted by $T_1$ and $T_2$ respectively, $T_1$ being larger than $T_2$.

A conclusion that can be drawn from FIG. 2 is that at a given $C_2/H_2$ ratio a higher temperature $T_1$ gives a higher SI $b$. To insure a constant SI $c$ the value of $C_2/H_2$ must therefore be increased to $d$, which implies that at higher temperatures the quantity of $H_2$ must be diminished.

If the degree of conversion is increased while the temperature remains constant, the value of $C_2/H_2$ decreases to $e$, because the quantity of ethylene present diminishes. To achieve a constant SI of $c$ in this case, the value of $C_2/H_2$ must therefore remain constant, so that the quantity of $H_2$ must be diminished.

The following examples will further elucidate our specific method for practicing the invention.

Example 1

In the preparation of polyethylene by a process employing the method of process control of the present invention, ethylene (20.6 kg./h.) was dissolved in gasoline (87.5 kg./h.) in dissolving tank 1. This monomer solution was then introduced into absorber 11 along with a hydrogen feed (0.003 kg./h.) wherein the hydrogen was absorbed. The resulting mixture was cooled to —25° C. and fed into reactor 16. Three catalyst solution streams (together 0.75 kg./h.) were supplied to reactor 18 through lines 19, 20 and 21 respectively. The effluent left the reactor at 180° C. and contained polyethylene (20 kg./h.), ethylene monomer (0.6 kg./h.), hydrogen (0.003 kg./h.) and gasoline solvent (87.5 kg./h.). The calculated degree of conversion to polyethylene was 97%. The polyethylene melt index was determined by the ASTM Method D–1238–57 T to be about 10.

The influence of the catalyst was then changed to 75% of its value. When equilibrium was reached the hydrogen flow to absorber 11 had been increased by controller 30 through control valve 13 to 0.004 kg./h. The effluent leaving reactor 16 was then at 178° C. and contained polyethylene (19.77 kg./h.), ethylene monomer (0.825 kg./h.), hydrogen (0.004 kg./h.), and gasoline solvent (87.5 kg./h.), giving a degree of conversion of 96%. The polyethylene melt index was determined by the ASTM Method D–1238–57 T to be about 10.

Example 2

Subsequent to Example 1, and after equilibrium was achieved, the temperature of the monomer-hydrogen feed solution into reactor 16 was increased to —20° C. As a result, when equilibrium was again achieved, the catalyst solution feed into reactor 16 had been reduced by controller 25 through control valves 22, 23 and 24 to 0.45 kg./h. Similarly, the hydrogen feed into absorber 11 had been increased by controller 30 through control valve 13 to 0.005 kg./h. The effluent leaving reactor 16 was then at 180° C. and contained polyethylene (19.57 kg./h.), ethylene monomer (1.03 kg./h.), hydrogen (0.005 kg./h.) and gasoline solvent (87.5 kg./h.), giving a degree of conversion of 95%. The polyethylene melt index was determined by the ASTM Method D–1238–57 to be about 10.

The above examples are given for illustrative purposes only and are in no way to be construed to limit the applicability of the present invention to processes for the preparation of polyethylene. The process control of the present invention has been found suitable for the preparation of any number of homopolymers from monomers such as ethylene, propylene, butylene, butadiene and isoprene and copolymers from any combination of such monomers.

The above examples are given for illustrative purposes only and are in no way to be construed to limit the applicability of the present invention to processes for the preparation of polyethylene. The process control of the present invention has been found suitable for the preparation of any number of homopolymers from monomers such as ethylene, propylene, butylene, butadiene and isoprene and copolymers from any combination of such monomers.

What is claimed is:

1. In a method of controlling the polymer melt index in a process for the continuous preparation of a polymer in which a solution of at least one monomer, hydrogen, and at least one catalyst are brought together in a reactor wherein the amount of hydrogen present is controlled in relation to measurement data, that improvement consisting essentially in holding substantially constant the monomer feed, the temperature in said reactor and the degree of conversion, wherein the degree of conversion is at least about 90%, and measuring the monomer to hydrogen ratio in the effluent stream leaving said reactor, and maintaining said ratio at a predetermined value by controlling the quantity of hydrogen present in said reactor in sole essential relation to said ratio by increasing the hydrogen flow when the monomer to hydrogen ratio is too high, and decreasing the hydrogen flow when the monomer to hydrogen ratio is too low.

2. The method of claim 1 wherein the temperature in said reactor is held substantially constant by controlling the quantity of catalyst fed to said reactor.

3. The method of claim 1, wherein the polymer is prepared by solution polymerization.

4. The method of claim 3, wherein the degree of conversion is at least about 96%.

5. The method of claim 3, wherein the polymer is a polyolefin.

6. The method of claim 5, wherein the polyolefin is polyethylene.

7. The method of claim 6, wherein the degree of conversion is at least about 96%.

References Cited

UNITED STATES PATENTS

| | | | |
|---|---|---|---|
| 3,356,667 | 12/1967 | Smith et al. | 260—94.9 P |
| 3,709,853 | 1/1973 | Karapinka | 260—94.9 P |

JOSEPH L. SCHOFER, Primary Examiner

A. HOLLER, Assistant Examiner

U.S. Cl. X.R.

260—80.7, 80.78, 85.3 R, 88.2 B, 93.7, 94.2 R